(12) United States Patent
Calis et al.

(10) Patent No.: US 8,137,436 B2
(45) Date of Patent: Mar. 20, 2012

(54) HUMIDIFIER MEMBRANE

(75) Inventors: Gijsbertus Hendrikus Maria Calis, Hulsberg (NL); Edwin Henricus Adriaan Steenbakkers, Voerendaal (NL); Paul Osenar, Westford, MA (US); Richard M. Formato, Grafton, MA (US); Paul Sabin, Needham, MA (US); Seth Avis, Chestnut Hill, MA (US)

(73) Assignee: Lydall Solutech B.V. (NL)

( * ) Notice: Subject to any disclaimer, the term of this patent is extended or adjusted under 35 U.S.C. 154(b) by 365 days.

(21) Appl. No.: 12/445,705

(22) PCT Filed: Oct. 9, 2007

(86) PCT No.: PCT/EP2007/008710
§ 371 (c)(1),
(2), (4) Date: Sep. 23, 2009

(87) PCT Pub. No.: WO2008/043507
PCT Pub. Date: Apr. 17, 2008

(65) Prior Publication Data
US 2010/0203400 A1    Aug. 12, 2010

Related U.S. Application Data

(60) Provisional application No. 60/907,720, filed on Apr. 13, 2007.

(30) Foreign Application Priority Data

Jun. 5, 2007   (EP) ..................................... 07011029

(51) Int. Cl.
*B01D 53/22* (2006.01)

(52) U.S. Cl. ................ 95/52; 95/43; 95/45; 96/4; 96/10
(58) Field of Classification Search ................ 95/43, 45, 95/52; 96/4, 10
See application file for complete search history.

(56) References Cited

U.S. PATENT DOCUMENTS 4,298,666 A * 11/1981 Taskier ......................... 429/206
4,346,142 A *  8/1982 Lazear ........................ 428/315.7
(Continued)

FOREIGN PATENT DOCUMENTS
CN    1640533 A    7/2005
(Continued)

OTHER PUBLICATIONS

Foreign communication from a priority application—International Preliminary Report on Patentability, PCT/EP2007/008710, Apr. 15, 2009, 7 pages.

(Continued)

*Primary Examiner* — Jason M Greene
*Assistant Examiner* — Anthony Shumate
(74) *Attorney, Agent, or Firm* — Cantor Colburn LLP

(57) ABSTRACT

A passive humidifier membrane includes polyolefin with a plurality of pores, wherein the average pore size of the plurality of pores is 0.05 μm to 0.4 μm as established by a PMI Capillary Flow Porometer. The humidifier membrane is virtually airtight while providing a high transfer rate of water. Transfer of heat is also high. The humidifier membrane is particularly suitable for heat exchange and water transfer between fluids and, it is particularly useful for applications inside or outside fuel cells such as PEMFC. The membrane is also particularly useful in the application as humidifier for air or oxygen.

28 Claims, 3 Drawing Sheets

U.S. PATENT DOCUMENTS

| | | | |
|---|---|---|---|
| 4,605,165 A * | 8/1986 | Van Loveren et al. | 239/6 |
| 6,106,964 A * | 8/2000 | Voss et al. | 429/413 |
| 6,274,259 B1 | 8/2001 | Grasso et al. | |
| 6,635,104 B2 | 10/2003 | Komkova et al. | |
| 2002/0104439 A1 | 8/2002 | Komkova et al. | |
| 2006/0205301 A1 | 9/2006 | Klare et al. | |

FOREIGN PATENT DOCUMENTS

| | | |
|---|---|---|
| EP | 0 740 952 A1 | 11/1996 |
| EP | 1921702 A1 | 5/2008 |
| JP | 56090838 A | 7/1981 |
| JP | 10212850 A | 8/1998 |
| WO | WO 93/01622 | 1/1993 |
| WO | 0167533 A2 | 9/2001 |
| WO | 2008043507 A1 | 4/2008 |

OTHER PUBLICATIONS

Foreign communication from a priority application—International Search Report and Written Opinion, PCT/EP2007/008710, Nov. 30, 2007, 9 pages.

Provisional patent application entitled "Humidifier membrane," by Gijsbertus Hendrikus Maria Calis, et al., filed Oct. 11, 2006 as U.S. Appl. No. 60/850,620.

Provisional patent application entitled "Humidifier membrane," by Gijsbertus Hendrikus Maria Calis, et al., filed Apr. 13, 2007 as U.S. Appl. No. 60/907,720.

* cited by examiner

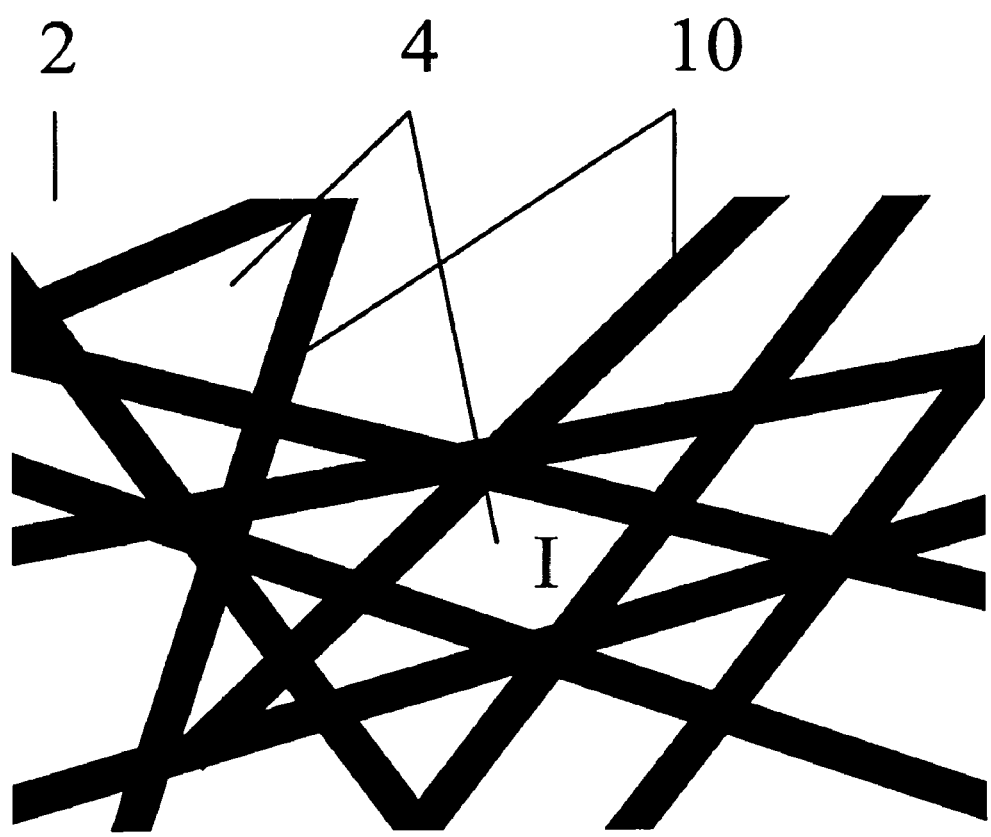

HUMIDIFIER MEMBRANE

CROSS-REFERENCE TO RELATED APPLICATIONS

The present application claims the benefit of priority under 35 U.S.C. 119 to International Patent Application No. PCT/EP2007/008710 filed Oct. 9, 2007, which claims the benefit of priority to U.S. Provisional Application No. 60/907,720 filed Apr. 13, 2007, the contents of which are hereby incorporated by reference in their entirety.

The invention relates to a membrane with water transfer capability. Particularly, the invention relates to a membrane with passive water transfer capability.

Gastight membranes with the capability of transferring gasses—and in particular water—are known in the art. Such membranes are for example utilised in fuel cells for humidifying the input streams. However, the humidifiers may be subject to rather harsh conditions including thermal cycling, dry out and flooding, and the technical solutions have therefore been rather complex and/or costly.

Humidifier membranes are known for example from U.S. Pat. No. 6,106,964, which discloses the use of a ionomer membrane for transfer of moisture in a solid polymer fuel cell. The typical ionomer used is a perfluorosulfonic acid sold under the trade name Nafion 117. This group of materials provides an appropriate transfer rate of water, but they suffer from a number of serious drawbacks for this application. The material is very costly and swelling by water uptake is rather high.

Another type of humidifier membranes for fuel cell applications is disclosed for example in U.S. Pat. No. 6,274,259. This humidifier membrane comprises a support matrix with hydrophilic pores having a pore size range between 0.1 to 100 μm and a liquid transfer medium, which wets the pores. The support matrix is a layer of graphite, graphite-polymer, inorganic fiber thermoset polymer, glass fiber, synthetic fiber filter papers, porous metal, perforated metal, porous compatible plastics with or without wettability treatments, or mixtures of those layers. The liquid transfer medium may include water and preferred liquids are aqueous salt solutions, aqueous acid solutions and organic antifreeze-water solutions, which have a freezing point less than 0 degrees Fahrenheit (ca. −18° C.).

Despite the very broad class of materials suggested as support matrix, it is explicitly stated in U.S. Pat. No. 6,274,259 that ionomer and polymer films are considered non-suitable for humidifier membrane applications due to high cost and lack of chemical stability.

Another type of humidifier membranes are disclosed for example in WO 01/67533, which discloses a microporous polymer and an inorganic hydrophilic additive in the microporous polymer. The hydrophilic additive is silica or alumina.

JP 9-31226 discloses a hydrophilic polyethylene fine porosity film filled with liquid electrolyte of phosphoric acid and dipropylene glycodiethylether. The film is used as an ionic conductor for a fuel cell. The polyethylene has a weight average molecular weight of $7 \times 10^5$ g/mole and comprises a component of lower molecular weight polyethylene and it has been graft polymerized with an acrylic monomer to an extent of 5 to 30 weight-% with the higher values being preferred. The grafting is realised using electron radiation and substantial radiation damage to the backbone of the polymer may therefore be foreseen. The document does not mention humidifier membranes.

There is hence a need for a humidifier membrane, which is both affordable, durable and provides an appropriate transfer rate of water.

It is the object of the invention to provide an improved humidifier membrane.

It is another object of the invention to provide a method of manufacturing of an improved humidifier membrane.

It is a further object of the invention to provide advantageous uses of an improved humidifier membrane.

One or more of the above and other objects of the invention are realised by a humidifier membrane consisting substantially of polyolefin fibrils forming a microporous web with a plurality of pores. It was found that the average pore size is about 0.05 μm to 0.4 μm as established by a PMI Capillary Flow Porometer and the humidifier membrane has a hydrophilic surface arranged at the surface of the fibrils. The hydrophilic surface is hence both arranged inside the pores and on the outer surface of the humidifier membrane. The humidifier membrane has a Gurley number above about 300 s/50 ml at 50% relative humidity but the membrane is virtually impermeable to gas at higher humidity—particularly when the membrane is saturated (see discussion below).

By consisting substantially of polyolefin fibrils is understood by the person skilled in the art that nearly all of the dry membrane is polyolefin, such as at least 75 weight-% of the dry membrane. In most cases, at least 90 weight-% of the dry membrane according to the invention is polyolefin. If the membrane is hydrophilised by grafting with hydrophilic monomer or polymer, then this hydrophilic monomer or polymer should be disregarded in this calculation of the polyolefin weight-%. If hydrophilisation by grafting is utilised, then typically 10-30 weight-% hydrophilic monomer or polymer is grafted to the polyolefin during hydrophilisation. The preferred polyolefins are polyethylene (particularly ultrahigh molecular weight polyethylene, as UHMWPE allows for very strong membranes) and polypropylene (particularly isotactic polypropylene as i-PP allows for alignment of molecules similar to polyethylene).

The transfer rate of water through the humidifier membrane is above about 400 (g*mm)/(m²*day) at 70° C. from a first gas having a relative humidity of 100% on a first side of the humidifier membrane to a second gas having a relative humidity of 50% at a second side of the humidifier membrane for passive transfer of water. Please observe that the unit of the transfer rate of water incorporates the thickness of the membrane, as it was found that this parameter should be included to more properly compare various membrane types, such as composite membranes, pure ionomer membranes and the present membranes. It is highly preferred that the transfer rate of water through the humidifier membrane is above about 450 (g*mm)/(m²*day) at 70° C., such as about 450 to 600 (g*mm)/(m²*day) at 70° C.

Finally, it should be observed that the membranes according to the present invention allow for passive transfer of water. By passive membrane and passive water transport is herein meant that the transport through the membrane is governed by the conditions on both sides of the membrane and no external power source, such as an electricity source or a difference in total pressure, is required for the transport to take place. Even though membrane is characterised by the required value of passive transfer of water, the membrane may be utilised with difference in total pressure between the first side of the membrane and the second side of the membrane. In such cases, the contribution (positive or negative) from the difference in total pressure is typically additive to the passive contribution to the transfer of water.

The membrane is typically gastight during use, or transport of gas through the membrane is at least strongly restricted. See also discussion in the section regarding the Gurley number.

It should be observed that membrane properties, such as Gurley number and water transfer rate, may vary considerably for a given chemical polymer composition due to for example differences in pore size, structure, distribution of phases, molecule shape and length, which is the main reason why it is required to define the present invention by properties rather than by composition.

Surprisingly, it was found that the above defined set of properties provided a superior membrane irrespective of the detailed chemical composition.

Another aspect of the invention concerns a method of manufacturing the humidifier membrane according to the invention. The method comprises the steps of providing a microporous web of polyolefin fibrils, which microporous web has a plurality of pores prior to hydrophilisation. The porosity of the microporous web prior to hydrophilisation should preferably be in the order of 50 to 85% to allow for a high amount of pores and yet a strong resulting humidifier membrane. The average pore size prior to hydrophilisation is 0.1 µm to 0.5 µm as established by a PMI Capillary Flow Porometer. Thereafter a hydrophilic monomer is grafted to the surface of the microporous web of polyolefin fibrils whereby at least part of the surface of the microporous web of polyolefin fibrils is made hydrophilic and the resulting humidifier membrane is formed. The surface of the microporous web that is made hydrophilic is preferably at least an inner part of the microporous web, i.e. at least a part of the surface of the fibrils forming the pores and not solely on an outer surface part of the microporous web. It was found to be highly advantageous that substantially the entire inner surface was made hydrophilic by the treatment as this allowed for relatively uniform wetting of the fibrils and hence lead to an improved performance of the humidifier membrane.

Other methods of providing a hydrophilic membrane exist, such as use of corona treatment or utilizing a polymer, which is inherently hydrophilic.

Furthermore, it was found to be advantageous that also the outer surface of the microporous web was made hydrophilic, as this allowed for a better transport of water to and from the pores.

The grafting process should preferably reduce the pore size of the microporous web so that the average pore size of the resulting humidifier membrane is 0.05 µm to 0.4 µm as established by a PMI Capillary Flow Porometer. This average pore size range is particularly advantageous since this allowed for a very thorough hydrophilisation of the porous web and hence improved performance of the material.

The hydrophilic monomer may be one or more monomers with one or more polar groups, such as monomers comprising among others hydroxyl groups and/or acid groups. Such hydrophilic monomers are well known to the person skilled in the art. Experimental work has shown that particularly hydrophilic chemicals from the family of acrylic acids are highly advantageous since they are easily grafted to the fibrils, particularly polyethylene fibrils. Furthermore, hydrophilic chemicals from the family of acrylic acids may relatively easy be transported into the pores thereby allowing for a very uniform hydrophilic character to the fibril surface both inside the microporous membrane and on the outer surfaces of the humidifier membrane. Preferred examples of hydrophilic chemicals from the family of acrylic acids are acrylic acid, benzyl-acrylic acid, vinyl-acrylic acid, lauryl-acrylic acid, stearyl-acrylic acid, methacrylic acid and derivatives of these acids and acrylamide.

The hydrophilic chemical from the family of acrylic acids may optionally have various further substituents as known from the family of acrylic acids. Other suitable monomers are vinyl derivatives such as vinyl pyridine, N-vinyl amide, vinyl alcohols, vinyl esters, vinylidene chloride and derivatives, still another group of suitable monomers are styrene and derivatives such as sodium-styrene-sulfonic acid.

The grafting process preferably involves preparing a solution of water and hydrophilic monomer. Thereafter the microporous web of polyolefin fibrils is submersed into the solution to completely soak the structure. It was found that particularly solutions with acrylic acid monomer(s) were suitable for wetting pores of a microporous web of polyethylene fibrils.

Then the wetted microporous web of polyolefin fibrils is exposed to ionising radiation which activates the grafting reaction between the polyolefin fibrils and the hydrophilic monomers. It was found that particularly UV radiation is suitable, as UV radiation provided a suitable activation of the polyolefin fibrils without introduction of unduly radiation damage to the web. Since the microporous web is typically 10-50 µm thick, UV radiation will penetrate through the whole thickness of the web and provide quite uniform activation of the polyolefin, i.e. both on the inner surface as well as the outer surface.

After the grafting reaction has been completed, water and remaining non grafted chemicals are being washed out from the web and the membrane is dried.

Another method of manufacturing the humidifier membrane according to the invention involves modification of the microporous web of polyolefin fibrils by corona or plasma treatment to hydrophilise at least a part of the surface of the microporous web of polyolefin fibrils. Such hydrophilisation methods result in an uneven distribution of hydrophilic groups with a higher concentration at or close to the membrane surface closest to the ionisation source. Therefore it is preferred to utilise the chemical treatment described above wherein the ionising UV radiation is activating the chemical reaction of the fibril surface and the hydrophilic groups.

ABBREVIATIONS

Unless otherwise explicitly stated, the following abbreviations are utilised throughout the present description.
PE: Polyethylene
MW: Weight-average molecular weight
UHMWPE: Ultra high (weight-average) molecular weight polyethylene. This corresponds to MW of 500,000-10,000,000 g/mol
PEMFC: Proton exchange membrane fuel cell
RH: Relative humidity
Pore Size Measurement During manufacturing of the humidifier membranes according to the invention the membrane is stretched. Hence, the polymer is highly oriented parallel to the surface of the humidifier membrane. This leads to a substantially layered structure with the shape of the pores being far from pipe-shaped. The average pore size is therefore defined as the pore diameter value realised by the pore size measurement as described below, and it should be observed that this value not necessarily is the same as what could be observed by e.g. micrographs. The measured average pore size rather represents a value for pore size which may be compared to similarly measured average pore size for membranes having substantially the same structure. References to (average) pore size and (average) pore diameters herein are therefore related to the values obtained by the following method.

The pore size of the humidifier membrane is measured by a PMI (Porous Materials Inc., USA), Capillary Flow Porometer, CFP-1500-AG. For all measurements Fluor Inert (FC-40) was used as the wetting agent to wet the samples prior to the measurement.

Gurley Number (ASTM D727-94)

The Gurley number indicates the permeability of air through the membrane. The Gurley number measured in relation to the present invention is the time it takes for 50 ml air to permeate through 6.554 $cm^2$ (1 square inch) of membrane, at 0.088 atm over pressure, 50% relative humidity and room temperature (23° C.). The measurement is performed on a standard Gurley densometer, Gurley Precision Instruments, Inc., Troy N.Y., USA. This measurement corresponding to ASTM D727-94 is also referred to as standard Gurley number as opposed to Gurley number during use, which herein refers to the same measurement but conducted at the temperature and humidity of the actual use (and not the previously mentioned standard conditions).

Generally speaking, a Gurley number of >10.000 s/50 ml indicates that the membrane is completely air tight. The membranes according to the present invention have standard Gurley numbers of at least 300 s/50 ml and typical values are in the order of 500 to 800 s/50 ml at 50% RH and 23° C. It should, however, be observed that the fact that the standard Gurley number is below 1000 does not necessarily indicate that the membrane is not airtight during the actual application. The membranes according to the invention have a hydrophilic internal and external surface and hence water vapour will be attracted and in fact will wet the internal and external surface pores. Due to the small size of the pores of the web of fibrils, the water attached to the inner and outer surface of the pores leads to blocking or at least considerable reduction of the effective size of the pores at high relative humidity or under the influence of liquid water, which again increases the Gurley number during use of the membrane (see also discussion on FIG. 1). Particularly, it should be kept in mind that humidifier membranes according to the invention typically are utilised with one of the sides of the membrane being exposed to higher relative humidity than 50% (typically about 100% RH or a liquid comprising water) and the membrane hence has a higher actual blocking of air transport through the membrane than the standard Gurley number indicates.

In other words, the Humidifier membrane according to the invention has preferably a Gurley number during use, which changes with the humidity of the fluids that the membrane is exposed to. Particularly, the Gurley number during use should increase (i.e. indicating reduction of permeability of the membrane to gasses) as the relative humidity is increased. Particularly, it was found to be advantageous to have a standard Gurley number of the membrane between about 300-9000 s/50 ml at 23° C. and 50% RH as this tends to lead to a membrane which will be blocked by liquid water or gas with about 100% RH during use and yet not provide a too long transport route in the liquid phase in the membrane.

To ensure that the fluids on the separate sides of the membrane does not mix directly, it is preferred that the Humidifier membrane has a Gurley number during use above about 10000 s/50 ml at 23° C. and 100% RH or at the conditions during use. In other words, the membrane should in this embodiment be completely impermeable to gas and water will only be transferred through the membrane via a liquid water phase arranged in the pores. A particular relevant example of having saturation of the membrane is when the membrane is in direct contact with liquid water or a liquid aqueous solution and the membrane has access to as much water as it can absorb.

It is clearly advantageous not to have a low Gurley number during use for the wetted membranes, as the membranes should be nearly airtight during use. However, it was surprisingly found that, if there is a significant difference between the water vapour pressures on each side of the membrane the Gurley numbers during use measured under the wetting conditions as mentioned above, are higher than 10.000 s/50 ml thus realising the best performance of the humidifier membrane in use. Based on this, it could be theorised that the optimum situation is where the humidifier membrane has a relatively open structure, which becomes just gastight during use due to absorption of water so that the membrane is gastight. The water transport from the wet side of the membrane to the dryer side of the membrane is governed by diffusion due to the difference of the water concentrations in the fluid at each side of the membrane. The transfer of water may take place by gas phase diffusion, by liquid phase diffusion or—most likely—by a combination of gas phase diffusion and liquid phase diffusion.

Another aspect of the Gurley number is the risk of drying out or flooding of the humidifier membrane. This may typically take place during start-up conditions, closing conditions or in applications with varying operation conditions. It should be observed that even though the air permeability may vary with variable relative humidity on each side of the membrane, the variation in air permeability is completely reversible, and the humidifier membrane according to the invention does not suffer any permanent damage from neither drying out nor flooding. The system is hence very versatile and durable under standard operation conditions and outperforms the present alternatives in this aspect of durability.

It should be observed that the Gurley number may vary considerably for a given polymer membrane composition due to for example differences in pore size, structure, distribution of phases, molecule shape and length, as well as humidity. The Gurley number therefore provides a more meaningful description of the performance and properties of a membrane than the chemical composition of the membrane does.

Measurement of Water Vapour Transfer Rate (ASTM E96B)

The water vapour transfer rate is measured according to ASTM E96B. The measurement is conducted at 70° C. by sealing a beaker with water (i.e. 100% relative humidity at 70° C.) with the humidifier membrane to be tested and providing an atmosphere with 50% relative humidity at 70° C. above the membrane. The measured transfer of water is hence completely passive and may be measured as the loss of weight of the water in the beaker over time.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DETAILED DESCRIPTION

Figure 1:
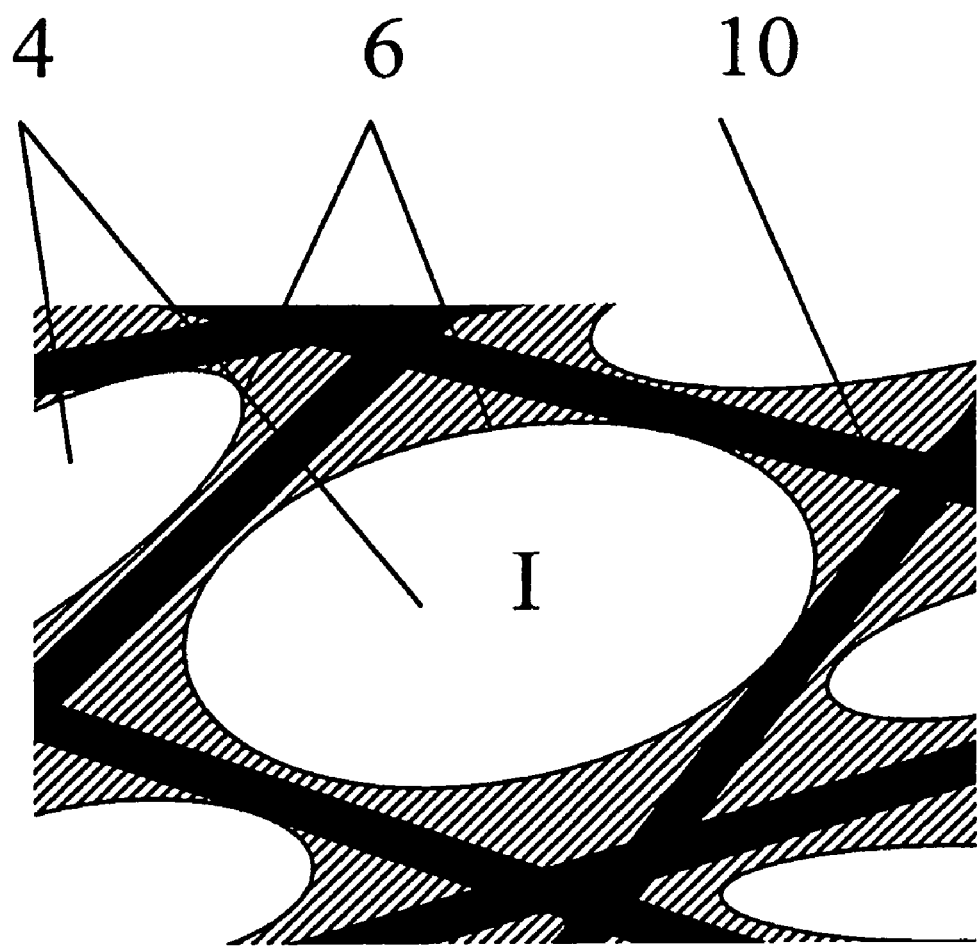
FIG. 1 shows a principle sketch of a cross section of a humidifier membrane according to the invention.
Figure 1:
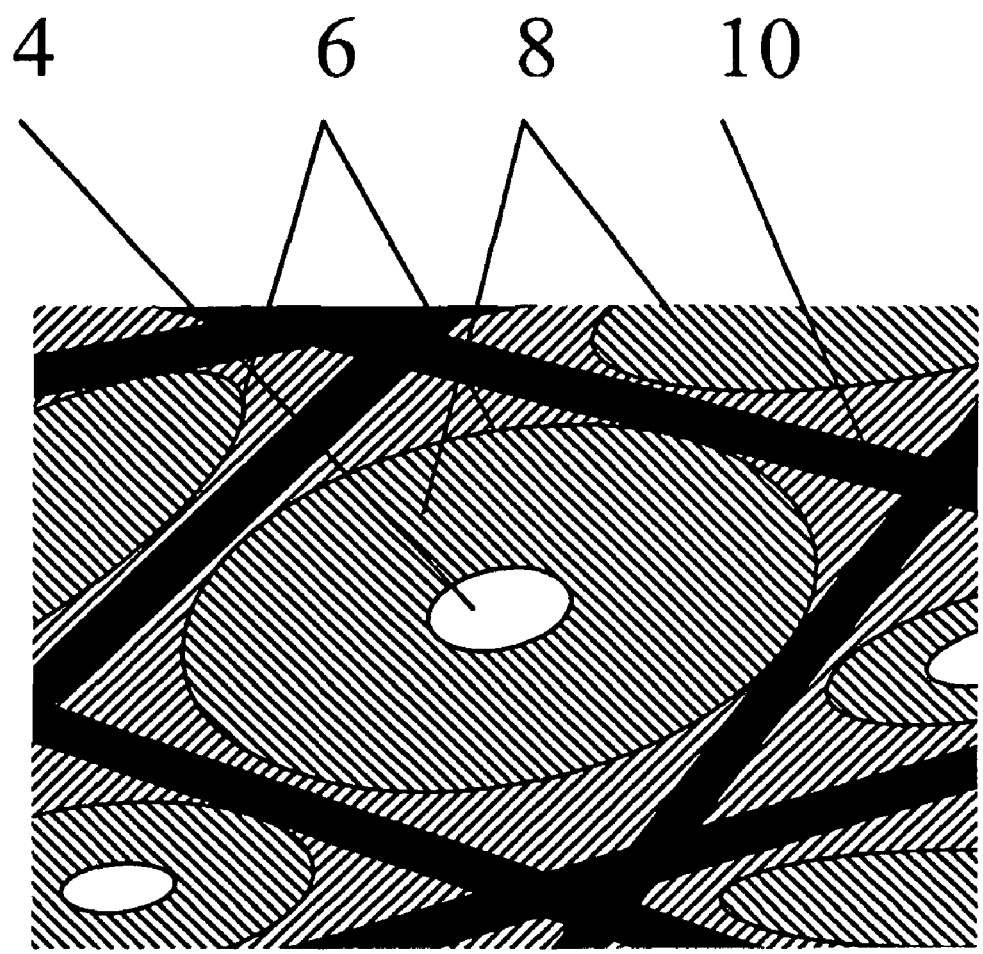

The humidifier membrane 2 of FIG. 1 comprises a web of polyolefin fibrils 10 as shown in FIG. 1A. This web is also referred to as the reinforcement structure. A general method of manufacture of a polyolefin web is known in the art and is here preferably formed by extrusion or geltrusion followed by uni-, bi- or multi-directionally stretched to form a thin film or web of fibrils stretched parallel to the surfaces of the film. The stretching is typically in the order of 2-15 in both machine and transverse direction, whereby a layered structure of highly aligned fibrils are formed. Casting techniques (followed by stretching) may also be used for forming of the membrane, but this is not the preferred embodiment. The fibrils form a micro porous network with a plurality of pores 4 between the individual fibrils 10.

Then the web is grafted with a hydrophilic monomer so that the grafted monomers will point from the fibrils into the pores and thereby reduce the open area of the pores 4 and form a hydrophilic surface 6 in the pores. This may be seen in FIG. 1B, which represents an enlarged segment of FIG. 1A. The grafted hydrophilic monomer is observed in FIG. 1B as a layer 6 inside the pore 4. It should be observed that the grafted hydrophilic monomers not necessarily form a layer over the whole surface of the fibrils (as shown in FIG. 1B), but the grafted hydrophilic monomers may also form small islands or a more evenly spread pattern of molecular dots (not shown). The outer surface of the membrane is typically also made hydrophilic by the grafting reaction.

During use, the grafted polyolefin is subjected to water vapour or liquid water, and water will be absorbed and condensed as liquid water 8 at the hydrophilic surface 6 thereby reducing the pore size of the pores 4 even further and possibly to the extent that the pores are blocked by liquid water at the most narrow passages of the pores thereby forming an gastight membrane. In FIG. 1C both completely closed pores (top right pore, top left pore and bottom right pore) and partially obstructed pores (centre pore, middle right pore and bottom left pore) are shown. It should be understood that FIG. 1 only represents a sketch of one cross section of the membrane and that a high number of cross sections with similar obstructions of pores are present in the membrane leading to a membrane without or substantially without open paths through the membrane.

advantageous as UHMWPE may be processed by extrusion and afterwards being stretched to form a very strong and affordable membrane as well as a membrane that is both chemically and mechanically stable (e.g. with regard to thermal cycling and swelling behaviour). Experimental work has shown that good membranes were obtained for polyolefins comprising at least 75 weight-% UHMWPE but it was advantageous to utilise at least 90 weight-% UHMWPE.

In a particularly advantageous embodiment the polyolefin consists substantially of UHMWPE with a weight average molecular weight of about 500,000-10,000,000 g/mol. The lower limit corresponds to the required (lower) tensile strength of the membrane whereas the upper limit corresponds to an approximate limit where the material becomes too rigid to process easily.

The polyolefin part of the membrane is also referred to as the reinforcement part from the terminology of composite membranes. The polyolefin part may consist of one type of polyolefin (e.g. UHMWPE) or a mixture of several polyolefins; such as a mixture of UHMWPU and high density PE or other polyolefins. In the present case, other parts of the membrane than the reinforcement part is for example additives (such as viscosity, flexibility, or surface tension modifiers), (hydrophilic) coatings, fillers or non-polyolefin polymers.

In a highly advantageous embodiment, the membrane does not comprise a proton conductor other than water. Hence the type of proton conductors, which are not present in this embodiment, are for example ionomers such as polymeric ionomers like perfluorosulfonic acid sold under the trade or non-polyolefin polymers name Nafion 117. Since the ionomer is a very costly component in a composite humidifier membrane, this embodiment represents a substantial advantage due to reduced cost and reduced complexity. Particularly, it is highly advantageous that the membrane according to the present embodiment of the invention provides a thickness specific water transfer rate of about the same as a pure ionomer membrane without the costly ionomer member.

The porosity of the humidifier membrane is based on the ratio between the density of the humidifier membrane and the density of a dense polyolefin with the same composition as the polyolefin part of the membrane.

$$\text{Porosity} = 1 - \frac{\left(\frac{\text{Membrane weight}}{\text{Thickness} \cdot \text{Machine direction width} \cdot \text{Transverse direction width}}\right)}{\text{Density of dense polyolefin}}$$

In the following paragraphs a number of preferred embodiments of the invention are disclosed.

It has been found that for most applications the transfer rate of water is above about 10.000, and preferably between about 14.000 to 20.000 g/(m$^2$*day), or about 400 to 600 (g*mm)/(m$^2$*day) or more, the limit being determined by the balance of the water transfer rate and the water absorption rate. Hence the acceptable thickness of the membrane depends on the thickness specific transfer rate of the membrane. Typical acceptable values of the membrane thickness are in the order of 10-50 μm. It should be observed that due to the high strength of the polyolefin backbone relatively thin membranes are feasible as compared to e.g. membranes of pure ionomer. Therefore similarly high transfer rates of water may be realised for the membranes according to the present invention.

The polyolefin of the humidifier membrane is preferably polyethylene. Particularly, it was found that a high content of ultra high molecular weight polyethylene (UHMWPE) is This was found to be a fair estimate for the porosity for humidifier membranes based on hydrophilisation by grafting (since the density of the monomer or polymer to be grafted to the membrane has similar density) as well as hydrophilisation by corona treated membranes (as corona treatment has very limited effect on the density of the membrane). In a highly preferred embodiment, the humidifier membrane has a very high porosity. It was found that good humidifier membranes according to the invention have a porosity of about 50-85% at a relative humidity of 0%. The optimum porosity was a balance between strength (and hence composition) of the membrane and having a high porosity. It was found to be particularly advantageous was humidifier membranes with porosity of about 70-85% at a relative humidity of 0%, as this provided sufficient strength for the preferred thickness range of 10-50 μm for most of the materials. Particularly for membranes of UHMWPE or a high fraction of UHMWPE, the porosity range of 70-85% leads to highly advantageous humidifier membranes.

In a highly preferred embodiment, the hydrophilic surface of the humidifier membrane is obtained by grafting a monomer comprising a hydrophilic group on the polyolefin. This allows for a controlled hydrophilicity with regard to distribution and strength of hydrophilicity. Furthermore, grafting a monomer comprising a hydrophilic group on the polyolefin is a relatively efficient method of making a polymer hydrophilic when initiated by UV radiation.

Experimental work has shown that particularly advantageous humidifier membranes according to the invention are those where the hydrophilic surface comprises a hydrophilic chemical from the family of acrylic acids. The acrylic acids may form a co-polymer with the polyolefin but it was found to be particularly advantageous when the acrylic acids were chemically bonded to the polyolefin as a monomer grafted on the polyolefin.

In a preferred embodiment, the humidifier membrane according to the invention comprises about 1 to 15 weight-% hydrophilic chemical grafted on the polyolefin. Experimental work has shown that particularly about 2 to 10 weight-% hydrophilic chemical grafted on the polyolefin is advantageous, as this allows for the membrane to be hydrophilic with a limited reduction of the pore size and hence a better control of the actual pore size after the grafting.

The combination of acrylic acids and ultra high molecular weight polyethylene provided a particularly advantageous humidifier membrane, as this combination provided excellent high dimensional stability and strength. Furthermore, the combination provided a highly affordable membrane with high water transfer rates through the membrane.

When the humidifier membrane is manufactured by hydrophilisation of a polyolefin backbone with a plurality of pores, it was found that the pores preferably should be a bit larger in the polyolefin backbone prior to hydrophilisation than the desired pore size of the final membrane. This is particularly important if the membrane or polyolefin backbone is hydrophilisation by grafting with a hydrophilic chemical. More specifically, it was found that the average pore size of the plurality of pores prior to hydrophilisation advantageously may be 0.1 µm to 0.5 µm as established by a PMI Capillary Flow Porometer.

The surface of the humidifier membrane may also be hydrophilised by ionising radiation followed by reaction with gaseous species present in the pores (e.g. $N_2$, $O_2$, $CO_2$, or dedicated reactive species introduced prior to or following the ionising radiation treatment. Particularly, corona treatment and plasma treatment are advantageous for this type of hydrophilisation of the membrane in that the processing is relatively fast and simple as compared to hydrophilisation by grafting as has been mentioned above.

The humidifier membrane according to the invention is highly suitable and may advantageously be utilised to prevent direct mixing of a first fluid exposed to a first side of the humidifier membrane and a second fluid exposed to a second side of the humidifier membrane, while simultaneously transferring only water from the first fluid to the second fluid. The fluids may be gasses, liquids or a combination of gasses and liquids on either one or both sides of the membrane. However, the humidifier membrane according to the invention is particularly advantageous when the fluids are gaseous as the ability to be airtight allows the full potential of the invention to be utilised. In another advantageous application, the first fluid (e.g. the high $p(H_2O)$ fluid) is a liquid and the second fluid is a gas. The liquids may be pure water, aqueous solutions or suspensions (such as saline or aqueous solutions containing organic or inorganic materials or multiphase liquid systems).

In this context 'prevent direct mixing' should be understood in the sense that the fluids are not in direct contact whereas the water component is capable of travelling between the fluids from the fluid with a high partial pressure of water to the fluid with a low partial pressure of water. Particularly, the membrane prevents the oxygen and the nitrogen fraction of a gaseous fluid from mixing directly through the membrane according to the present invention.

In a highly advantageous embodiment of the invention, the transfer of water from the first fluid to the second fluid through the membrane is passive in the sense that the transport through the membrane is governed by the conditions on both sides of the membrane and no external power source is required for the transport to take place. The driving force is hence the difference in partial pressure of $H_2O$ between the fluids. If for example water is to be transferred from the first fluid to the second fluid via the humidifier membrane passively, then the partial pressure of water in the first fluid should be higher than the partial pressure of water in the second fluid. The difference in partial pressure may be based on a difference in one or more of the water (liquid/vapour) fractions of the fluid, the temperature and the total pressure of the fluid. Between fluids with the same temperature and total pressure, water will hence be transferred net from the relatively wet fluid to the relatively dry fluid.

The membrane thickness should be low to reduce the diffusion distance of water (in both liquid and gaseous state) between the fluids and hence increase the transfer rate of water through the humidifier membrane. It was found that a membrane thickness of about 10-50 µm is suitable for most applications, as this allows for a suitable compromise between having sufficiently high membrane strength (particularly developed for UHMWPE membranes) and sufficiently low resistance to the water transport through the membrane. An important side effect of having this low thickness is that the membrane is highly suitable for transfer of heat between the first fluid and the second fluid. The heat transfer is enhanced by the fact that liquid water is present in at least a part of the pores during use. The membrane according to the invention is therefore particularly advantageous when not only water needs to be transferred between two fluids but also heat needs to be transferred from the relatively warm fluid on the first side of the membrane to the to the relatively cold side of the second side of the membrane or vice versa.

The heat transfer effect may advantageously be utilised when the humidifier membrane is used for moisturising or drying a gas in an enthalpy exchange air conditioning system or for moisturising or drying a gas in an enthalpy exchange ventilation system. For example, the humidifier may be contacted on the first main side to the air to be introduced to a room by an air conditioning system or a ventilation system and to a liquid water container—either directly to the liquid water or to an enclosure above the liquid water—on the second main side of the humidifier. By regulating the temperature of the water, the transfer rate of water between the humidifier may be finely tuned and particularly it is possible to realise a fixed humidity content of the air to be introduced. Control of the humidity is a key issue in ventilating and air-conditioning technology and systems, and the humidifier membrane according to the invention will therefore form a substantial part of a complete enthalpy exchange air-conditioning or enthalpy exchange ventilating system that comprises a humidifier membrane according to the present invention and increase the efficiency of the whole system.

The humidifier membrane according to the invention is particularly advantageous for use as a passive humidifier in a fuel cell. Due to the high strength as well as the combined high transfer rate of water and heat through the membrane, the humidifier membrane may be integrated in the fuel cell or the humidifier membrane may be provided as a separate component outside the fuel cell. The humidifier membrane is particularly advantageous for use in connection with low temperature fuel cells and particularly in PEMFC due to the high tolerance towards dry out and flooding. Control of the humidity is a key issue in fuel cell technology and fuel cell systems, and the humidifier membrane according to the invention will therefore form a substantial part of a complete fuel cell system that comprises a humidifier membrane according to the present invention and increase the efficiency and durability of the whole fuel cell system.

An advantageous application of the membranes according to the present invention is in apparatus for humidifier for air or oxygen. Such apparatus' may for example advantageously be used by athletes during low oxygen pressure training, as the air under these conditions typically has relatively low humidity which is very harsh for the mucous membranes, which may lead to uncomfortability or even bleedings. This is similarly the case when bottled air or gas mixtures are required for example during climbing of high mountains, emergency operation applications (such as fire fighting), aerospace applications and scuba diving. In a particularly preferred embodiment, the humidifier apparatus is portable. Since the humidifier membranes according to the present invention are very light weight and does not require complex support equipment, such as a power source, the present invention is particularly suitable for such applications.

Another advantageous use of the membrane according to the invention is for preparation of ultra pure water. In this use, the first side of the membrane is in contact with liquid water (first fluid), which is not ultra pure. Water from the first side will be transported passively through the membrane and released on the second side of the membrane as vapour (second fluid). By directing this vapour to a condenser member very clean water may be realised at considerably lower energy consumption than during traditional distillation of water.

A similar principle may be utilised for desalination. Here, liquid salty water is arranged in contact with the first side of the membrane according to the invention, and by passive transport through the membrane fresh water—as water vapour—is released at the second side of the membrane and may be recover by condensation. It should be observed that this method is not a filtration method. Salt may to some extend be deposited inside the membrane particularly if a non-continuous process are used. Such salt may be removed by washing the membrane in water, which is not saturated in salt.

Another advantageous use of the membrane according to the invention is for removal of water from a fluid. In this use, the first side of the membrane is in contact with the fluid to have water removed (first fluid), and the second side of the membrane, where water vapour is released, may be exposed directly to ambient atmosphere (second fluid) (if no collection of the water is required) or exposed to a standard condenser member to regain the water. A particularly advantageous example of this application is when the first fluid is a liquid-containing water, such as aqueous solution containing organic or inorganic material in a multiphase liquid system. Water may be a major component of the multiphase liquid system or only a minor component. If only a limited amount of water is present, balancing the size of the pores with the hydrophilicity of the fibrils becomes very important to prevent the non-water part of the fluid from penetrating through the membrane. Removal of minor amounts of water from chemical reactors is also a highly advantageous application of this aspect of the invention. Clearly, the membrane must be not accessible or substantially not accessible with regard to the first fluid. Other examples are waste water treatment, inline liquid control of membrane reactors or other chemical or biochemical reactors.

Another advantage of the humidifier membranes according to the present invention is that the durability is considerably better than for the state of the art humidifier membranes comprising ionomer without reinforcement. It is estimated that the typical durability of humidifier membranes according to the present invention is at least 10.000-20.000 hours in use, without the mechanical properties and the transfer rate of water deteriorating. Since the reinforcement mainly determines the durability, this level of durability will also apply for composite membranes of polyethylene and ionomer, which however are considerably more costly. This should be compared with an estimated 1000-5000 hours in use for pure ionomer humidifier membranes.

It should also be observed that the strength of membranes according to the invention is very high as compared to the pure ionomer membranes of the prior art. Typically, a biaxially stretched ultra high molecular weight polyethylene film forming a membrane according to the invention provides a tensile strength in the machine direction of about 50 MPa. The high strength allows for much thinner membranes and/or membranes that do not require supporting rigid grids during use. Furthermore, the elongation at break for such polyethylene membranes is typically in the order of 30% in the machine direction. This allows for a substantial (elastic) deformation during use without deteriorating the performance of the membrane. Tensile strength and elongation at break should be compared with the corresponding results for pure ionomer membranes. For Nafion the tensile strength at break is about 30-40 MPa, however the mainly plastic elongation at break is between 200-300%, which is very hard to control and leads to low durability.

It should be observed that even though high tensile strength and elongation at break are properties of all the membranes according to the invention as defined in the claims, these properties are particularly well developed for stretched ultra high molecular weight polyethylene film forming a membrane according to the invention, which material also provides a high dimensional stability with low linear swelling expansion in the order of 0.3% between 50% relative humidity and 100% relative humidity as measured at 80° C.

EXAMPLES

Five sample materials were prepared and tested with regard to air permeability and transfer rate of water.

Sample 1

A humidifier membrane according to the invention is prepared from a polyethylene film by extrusion and stretched bi-axially by an area factor of 50, whereafter the membrane was made hydrophilic by grafting with acrylic acid involving initiation with UV-light. The average pore size of the hydrophilic humidifier membrane is 0.1 µm as measured by a PMI (Porous Materials Inc., USA), Capillary Flow Porometer, CFP-1500-AG utilising Fluor Inert (FC-40) was used as the wetting agent. The Gurley number and the transfer rate of water were measured as described previously.

Comparative Sample 1

A dense Nafion™ film is prepared by casting the film from a suspension and drying off the solvent.

Comparative Sample 2

Composite membrane of microporous polyethylene with Nafion™ arranged in the pores.

Comparative Sample 3

Microporous polyethylene prepared as in sample 1 but not grafted with acrylic acid.

Comparative Sample 4

Humidifier membrane according to the invention. Microporous polyethylene prepared as in comparative sample 3 but treated by subjecting to corona treatment prior to testing.

Results

The results are summarised in Table 1.

| Sample | Thickness μm | Gurley number s/50 ml | Water permeability g/(m² * day) | (g * mm)/(m² * day) |
|---|---|---|---|---|
| Sample 1 | 31 | 600 | 14131 | 438 |
| Comp. 1 | 32 | ∞ | 18909 | 605 |
| Comp. 2 | 23 | ∞ | 21.300 | 490 |
| Comp. 3 | 10 | 1-2 | 19759 | 198 |
| Comp. 4 | 9 | 1-2 | 21181 | 191 |

Sample 1, according to the invention has a permeability of about 14.100 g/(m²×day) and a thickness specific permeability of about 440 g*mm/(m²×day), which are adequate for a humidifier membranes.

Comparative sample 1, a pure Nafion film, provided about 25% better permeability of water. However, comparative sample 1 exhibited a low dimensional stability with a linear swelling expansion in the order of 30% as compared to a linear swelling expansion of 0.3% for Sample 1 (both swelling expansions measured between 50% relative humidity and 100% relative humidity at 80° C.). Furthermore, the cost of comparative sample 1 is much higher than the cost of Sample 1 according to the invention.

Comparative sample 2 is a thin composite membrane of consisting of Solupor 3P07A (microporous polyethylene) filled with Nafion and is at equal thickness about 10% better than sample 1. Comparative sample 2 has improved dimensional stability, but is again much more expensive than Sample 1 according to the invention.

Comparative sample 3 is Solupor 3P07A (microporous polyethylene with high pore size) which is much less effective at equal thickness than the previous samples, which may be observed in that the permeability of Comparative sample 3 being only about 40% of the permeability of Sample 1 according to the invention.

Comparative sample 4 is the hydrophilic version of Solupor 3P07A, prepared by corona treatment and grafting with acrylic acid. The permeability results (Gurley number) of Comparative sample 4 are very similar to Comparative sample 3, and the permeability of water is equally pour. This is caused by the relatively large pore sizes of both samples of about 0.7 μm for both Comparative samples 3 and 4 as established by a PMI Capillary Flow Porometer. The pores were therefore sufficiently large to allow air to go through the membrane even after adsorption of water vapour molecules on the hydrophilic surfaces of the fibrils. The flow of water was thus reduced considerably as compared to Sample 1 according to the invention. It is hence not sufficient that the fibrils of the polyolefin are provided with a hydrophilic surface, but the pore size must also be adequate to achieve appropriate transfer of water through the membrane.

When comparing the results of the Examples, it is found that Sample 1 according to the invention is a surprisingly effective solution in that it provides an optimum combination of permeability, dimensional stability and material cost.

| TABLE OF IDENTIFICATION | |
|---|---|
| 2 | Membrane |
| 4 | Pore |
| 6 | Hydrophilic surface |
| 8 | Liquid water |
| 10 | Fibril |

The invention claimed is:

1. A humidifier membrane comprising:
polyolefin fibrils forming a microporous web with a plurality of pores, wherein an average pore size is 0.05 μm to 0.4 μm as established by a PMI Capillary Flow Porometer; and
a hydrophilic surface arranged at a surface of the fibrils,
wherein the humidifier membrane has a Gurley number above about 300 s/50 ml at 23° C. and 50% RH, and a transfer rate of water through the humidifier membrane above about 400 (g*mm)/(m²*day) at 70° C. from a first gas having a relative humidity of 100% on a first side of the humidifier membrane to a second gas having a relative humidity of 50% at a second side of the humidifier membrane for passive transfer of water.

2. The humidifier membrane of claim 1, wherein the transfer rate of water through the humidifier membrane is above about 10.000 g/(m²*day) and a thickness of about 10-50 μm.

3. The humidifier membrane of claim 1, wherein the polyolefin comprises at least 75 weight-% UHMWPE.

4. The humidifier membrane of claim 1, wherein the reinforcement structure consists substantially of UHMWPE with a weight average molecular weight of 500,000-10,000,000 g/mol.

5. The humidifier membrane of claim 1, comprising only water as a proton conductor of the humidifier membrane.

6. The humidifier membrane of claim 1, wherein porosity of the humidifier membrane is 50-85% at a relative humidity of 0%.

7. The humidifier membrane of claim 1, wherein the humidifier membrane has a Gurley number above about 10000 s/50 ml at 23° C. and 100% RH.

8. The humidifier membrane of claim 1, wherein the humidifier membrane has a Gurley number between about 300-9000 s/50 ml at 23° C. and 50% RH.

9. The humidifier membrane of claim 1, wherein the hydrophilic surface is obtained by grafting a monomer on the polyolefin, the monomer comprising a hydrophilic group.

10. The humidifier membrane of claim 1, wherein the hydrophilic surface comprises a hydrophilic chemical from the family of acrylic acids chemically bonded to the polyolefin as a monomer grafted on the polyolefin.

11. The humidifier membrane of claim 1, wherein the humidifier membrane further comprises a polyolefin backbone with a plurality of pores having an average pore size of 0.1 μm to 0.5 μm prior to hydrophilisation of the surface, the average pore size being established by a PMI Capillary Flow Porometer.

12. The humidifier membrane of claim 1, wherein the hydrophilic surface is hydrophilised by corona treatment or plasma treatment.

13. A method of using the humidifier membrane of claim 1, the method comprising:
using the humidifier membrane to prevent direct mixing of a first fluid and a second fluid while simultaneously specifically transferring water from the first fluid to the second fluid, wherein the first fluid is a gas or liquid and the second fluid is a gas.

14. The method of claim 13, wherein the transfer of water from the first fluid to the second fluid is passive.

15. A method of using the humidifier membrane of claim 1, the method comprising using the humidifier membrane to transfer heat between a first fluid and a second fluid.

16. A method of using the humidifier membrane of claim 1, the method comprising using the humidifier membrane as a passive humidifier in a fuel cell, wherein the humidifier membrane is integrated in the fuel cell or is provided as a separate component outside the fuel cell, and the fuel cell is a PEMFC.

17. A method of using the humidifier membrane of claim 1, the method comprising using the humidifier membrane to moisturize or dry a gas in an enthalpy exchange air conditioning system.

18. A method of using the humidifier membrane of claim 1, the method comprising using the humidifier membrane to moisturize or dry a gas in an enthalpy exchange ventilation system.

19. A method of using the humidifier membrane of claim 1, the method comprising using the humidifier membrane to humidify air or oxygen in a portable apparatus configured to be used in athletic applications, emergency operation applications or aerospace applications.

20. A method of using the humidifier membrane of claim 1, the method comprising using the humidifier membrane to prepare ultrapure water.

21. A method of using the humidifier membrane of claim 1, the method comprising using the humidifier membrane for desalination of water.

22. A method of using the humidifier membrane of claim 1, the method comprising using the humidifier membrane to remove water from a fluid.

23. A fuel cell system comprising the humidifier membrane of claim 1.

24. An enthalpy exchange air conditioning system comprising the humidifier membrane of claim 1.

25. An enthalpy exchange ventilation system comprising the humidifier membrane of claim 1.

26. A method of manufacturing the humidifier membrane of claim 1, the method comprising:
   providing a microporous web of polyolefin fibrils, which microporous web has a plurality of pores prior to hydrophilisation, wherein the average pore size prior to hydrophilisation is 0.1 µm to 0.5 µm as established by a PMI Capillary Flow Porometer;
   grafting a hydrophilic monomer to a surface of the microporous web of polyolefin fibrils to make at least a part of the surface of the microporous web of polyolefin fibrils hydrophilic to form a resulting humidifier membrane, wherein the average pore size of the resulting humidifier membrane is 0.05 µm to 0.4 µm as established by a PMI Capillary Flow Porometer.

27. The method of claim 26, wherein the hydrophilic monomer comprises a hydrophilic chemical of the family of acrylic acids.

28. A method of manufacturing the humidifier membrane of claim 1, the method comprising:
   providing a microporous web of polyolefin fibrils, which microporous web has a plurality of pores having an average pore size of 0.05 µm to 0.5 µm prior to hydrophilisation as established by a PMI Capillary Flow Porometer;
   treating a surface of the microporous web of polyolefin fibrils to hydrophilise at least a part of the surface of the microporous web of polyolefin fibrils by an ionizing radiation treatment that is a corona treatment or a plasma treatment.

* * * * *